US006323882B1

United States Patent
Jerome et al.

(10) Patent No.: US 6,323,882 B1
(45) Date of Patent: Nov. 27, 2001

(54) METHOD AND SYSTEMS FOR A GRAPHICAL REAL TIME FLOW TASK SCHEDULER

(75) Inventors: David H. Jerome, La Habra, CA (US); Richard Eugene Linn, Richmond, TX (US)

(73) Assignee: Simulation Sciences, Inc., Brea, CA (US)

(*) Notice: Subject to any disclaimer, the term of this patent is extended or adjusted under 35 U.S.C. 154(b) by 0 days.

(21) Appl. No.: 09/193,763

(22) Filed: Nov. 17, 1998

Related U.S. Application Data
(60) Provisional application No. 60/105,764, filed on Oct. 26, 1998.

(51) Int. Cl.$^7$ .............................. G09G 5/00; G06F 17/00
(52) U.S. Cl. ......................... 345/744; 700/83; 345/965; 345/835
(58) Field of Search ...................... 345/335, 333, 345/334, 336, 349, 348, 905, 967, 762, 765, 744, 835, 839; 700/17, 86, 87, 83

(56) References Cited

U.S. PATENT DOCUMENTS

| | | | |
|---|---|---|---|
| 5,826,236 | * 10/1998 | Narimatsu et al. | 705/8 |
| 5,850,221 | * 12/1998 | Macrae et al. | 345/348 |
| 5,902,352 | * 3/1999 | Chou et al. | 709/102 |
| 5,943,652 | * 8/1999 | Sisley et al. | 705/9 |

OTHER PUBLICATIONS

Jerry Banks, "Software for Simulation", Proceedings of the 1996 Winter Simulation Conference, pp. 31–38, Dec. 1996.*

Deborah Benson, "Simulation Modeling and Optimization Using Promodel", Proceeding of the 1996 Winter Simulation Conference, pp. 447–452, Dec. 1996.*

* cited by examiner

Primary Examiner—Raymond J. Bayerl
Assistant Examiner—Tadesse Hailu
(74) Attorney, Agent, or Firm—Knobbe, Martens, Olson & Bear, LLP (57) ABSTRACT

A system and method of creating and using a graphical task scheduler. A Graphical User Interface (GUI) allows a user to graphically build a real time flow task scheduler by providing a "click & drag" functional palette which contains graphical flow chart elements. By creating this graphical flow chart, the user is able to associate a plant layout, or any subpart of the entire plant, to its associated mathematical model. With a graphical flow chart, the user can define one or more exit branches for each task. For tasks with more than one exit branch, the user can specify the conditions causing the sequence to use each branch. Once the flow chart is set up, it can be used as a sequence editor or scheduler. The sequence editor defines the sequence of tasks that will be performed by an on-line application, such as optimization, and also allows scheduling of the on-line application at specific times or periodic intervals. The scheduler controls the running of each sequence based on the scheduling information. Once a plant has been optimized by the graphical task scheduler, the optimized data may be used to control plant operations.

14 Claims, 10 Drawing Sheets

METHOD AND SYSTEMS FOR A GRAPHICAL REAL TIME FLOW TASK SCHEDULER

The present application claims priority from U.S. Provisional Patent Application No. 60/105,764 filed on Oct. 26, 1998. The contents of that application, in its entirety, is hereby incorporated by reference.

BACKGROUND OF THE INVENTION

1. Field of the Invention

The present invention is related to systems and methods for providing a real time task scheduler for material processing systems. Specifically, the present invention relates to methods and systems for a graphical task scheduler for a manufacturing plant.

2. Description of the Related Art

Process industries, including but not limited to refining, chemical, petrochemical, and pharmaceutical processing, have experienced a need to operate ever more efficiently in order to remain competitive. This need has resulted in the development and deployment of process modeling systems. A process engineer uses these modeling systems to build a process model, or flowsheet, of an entire processing plant using equipment models provided by the modeling system. These flowsheet models are used to design and evaluate new processes, redesign and retrofit existing process plants, and optimize the operation of existing process plants. Typically, the process engineer must first build the flowsheet model, compile the model, and perform model checking before any model errors are detected.

Conventional modeling systems typically provide simulation, data reconciliation, and optimization of plant processes using corresponding separate programs and separate models. Ongoing computer and software technology advances have enhanced the modeling systems capabilities. The process engineer is now able to model larger and more complex processes with greater detail and precision.

Conventional modeling systems are complex and require a user to program the plant model into a computer. However, typically the process engineers associated with the design and optimization of a plant do not possess computer programming skills, while computer programmers do not possess the knowledge of the plant. The amount of time and energy lost in interfacing the process engineer with the computer programmers is substantial.

Once a plant is fully designed and optimized, it is often desirable to automate many of the features of the plant. To automate the plant, the process engineer would again interface with the computer programmer to develop a second software package. What is needed is a system where the modeling, optimization, and automation processes can be performed from a single software package. Further, applications should be simple and intuitive to construct without an in-depth knowledge of computer programming.

SUMMARY OF THE INVENTION

The present invention is a real time, on-line, optimization tool for refineries and plants, typically petroleum refineries and petrochemical plants. The present invention provides a unified modeling environment for both on-line and off-line applications, as well as a rigorous data reconciliation capability.

The present invention includes a graphical user interface allowing a user to construct real time sequences through a point-and-click interface. The user selects a task from a list and inserts the task into the appropriate location in the sequence. The user continues to add tasks to the sequence until the sequence is complete.

Each real time sequence is associated with a list of tasks whose execution can be scheduled or invoked on demand. In one embodiment, the tasks in the sequence are executed synchronously in a predefined order. For scheduled sequences, the user defines the schedule of execution. In another embodiment, there are two kinds of schedules that the user may choose from: schedules whose frequency is less than a day and those whose frequency is more than or equal to a day.

For schedules having a frequency of less than a day, the user enters a start time and a delta time. The delta time is the amount of time between scheduled execution and can be any amount of time less than 24 hours. The start time gives the basis from which the schedule is generated.

In one embodiment, for schedules having a frequency of more than a day, the user can choose a daily, weekly, or monthly based schedule. In any case, the user generally enters a start time, which specifies the time of day each execution is to begin, and effective date. For a daily schedule, the user also specifies the number of days between executions. For a weekly schedule, the user specifies the day of the week and the number of weeks between repetitions of the schedule. For a monthly schedule, the user specifies the day of the month and the number of months between executions.

Real time sequences are registered with a scheduler to be executed on a designated schedule. On-line sequences which are scheduled are initiated by the scheduler according to the defined on-line sequence schedule. On-line sequences which are unscheduled will not be scheduled but may be executed on demand. For example, a task in a scheduled sequence may demand the execution of an unscheduled sequence.

In one embodiment, on-line sequences have a limit time, which is the maximum amount of time that the sequence can take to execute. On-line sequences which continue to execute past the limit time are halted or killed by the scheduler.

A sequence may be designated as a model sequence for performing on-line optimization. These sequences are used to model the plant and perform optimization analysis. Once a model is optimized, the sequences may be used to control the plant operation.

The tasks of each sequence may include branching logic. This allows any task to have more than one exit branch. The user can define which exit branch is to be used based on a variety of factors.

BRIEF DESCRIPTION OF THE DRAWINGS

These and other features and advantages of the invention will become more apparent upon reading the following detailed description and upon reference to the accompanying drawings.

DETAILED DESCRIPTION OF A PREFERRED EMBODIMENT

Figure 1:
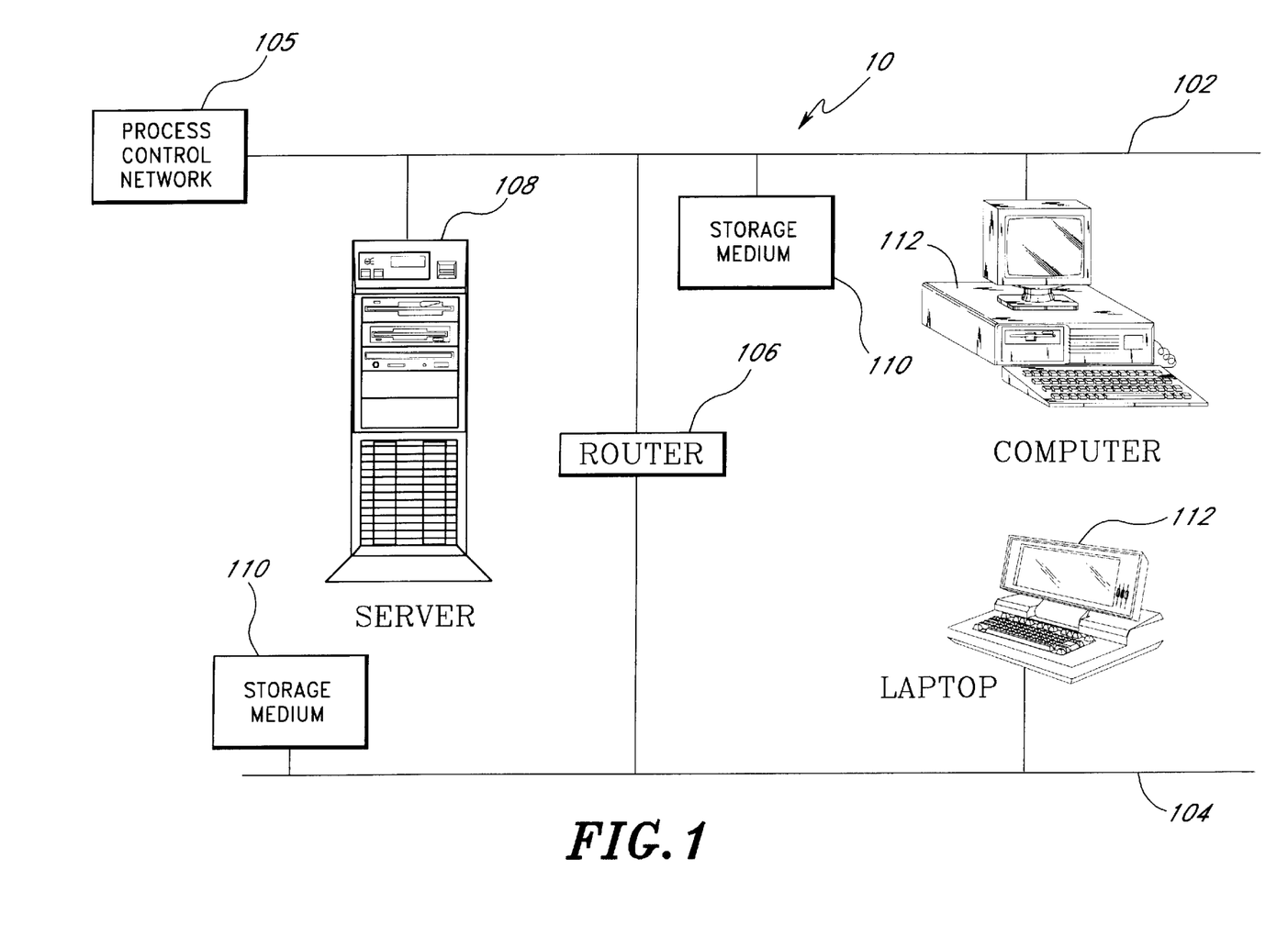
FIG. 1 illustrates the components used in a real time system according to one embodiment of the present invention.

The network architecture for one embodiment of the present invention is indicated generally at 10 in FIG. 1. (In FIG. 1 and throughout the drawings, components which correspond to components shown in previous figures are identified using the same reference numbers.) The system 10 may include a local area network (LAN) 102 which is connectable to other networks 104, including other LANs or portions of the Internet or an intranet, through a router 106 or similar mechanism. One example of such a LAN 102 may be a process control network 105 to which process control devices including process control computers are connected. Process control networks 105 are well known in the art and are used to automate industrial tasks. The network 104 may be a corporate computing network, including possible access to the Internet, to which other computers and computing devices physically removed from the plant floor are connected. In one embodiment, the LANs 102, 104 conform to Transmission Control Protocol/Internet Protocol (TCP/IP) and Common Object Request Broker Architecture (COBRA) industry standards. In alternative embodiments, the LANs 102, 104 may conform to other network standards, including, but not limited to, the International Standards Organization's Open Systems Interconnection, IBM's SNA®, Novell's Netware®, and Banyan VINES®.

The system 10 includes a server 108 that is connected by network signal lines to one or more clients 112. In one preferred embodiment, the server 108 includes a DEC Alpha® NT operating system. In an alternative embodiment, the server 108 includes a UNIX operating system. In one preferred embodiment, the client 112 includes a Windows® NT operating system. The server 108 and clients 112 may be configured by those of skill in the art in a wide variety of ways to operate according to the present invention. The server 108 and clients 112 may be uniprocessor or multiprocessor machines. The server 108 and clients 112 each include an addressable storage medium such as random access memory and may further include a nonvolatile storage medium such as a magnetic or an optical disk.

The system 10 also includes a storage medium 110 that is connected to the process control network 102 or corporate control network 104. In one embodiment, the storage medium 110 may be configured as a database from which data can be both stored and retrieved. The storage medium 110 is accessible by devices, such as servers, clients, process controllers, and the like, connected to the process control network 102 or the corporate control network 104.

Suitable servers 108 and clients 112 include, without limitation, personal computers, laptops, and workstations. The signal lines may include twisted pair, coaxial, telephone lines, optical fiber cables, modulated AC power lines, satellites, and other data transmission media known to those of skill in the art. A given computer may function both as a server 108 and as a client 112. Alternatively, the server 108 may be connected to the other network 104 different from the LAN 102. Although particular computer systems and network components are shown, those of skill in the art will appreciate that the present invention also works with a variety of other networks and components.

Figure 2:
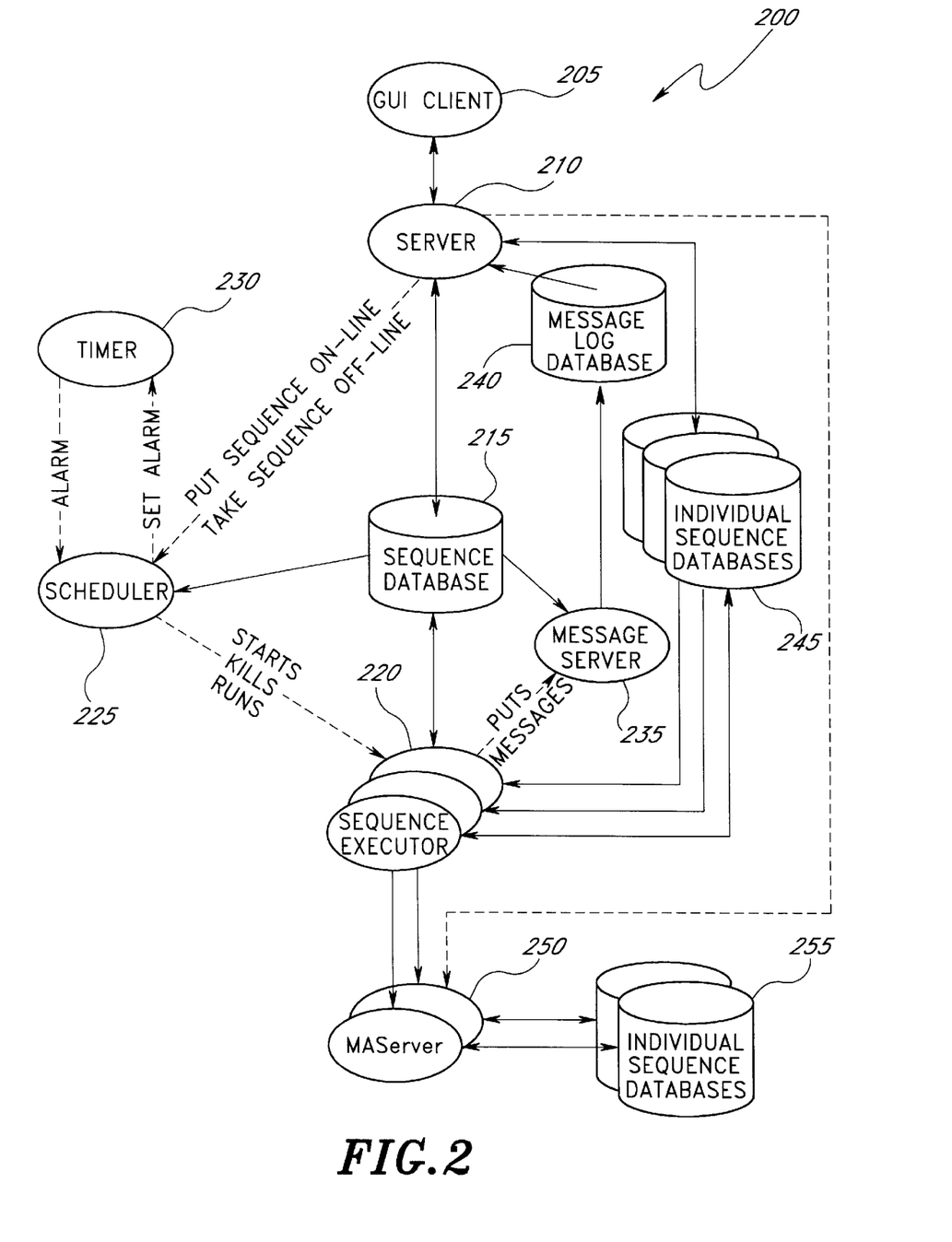
FIG. 2 is a diagram showing the components of the real time scheduling software according to one embodiment of the present invention.

FIG. 2 illustrates the process overview 200 of the real time subsystem according to one embodiment of the invention. A user interfaces with the real time set subsystem through a GUI client 205. The GUI client 205 may be one of the clients 112 from FIG. 1. The graphical user interface provided by the GUI client 205 provides a user-friendly method for a user to interact with the real time subsystem. The specifics of the GUI client 205 will be discussed below.

In one embodiment, sequences constructed by the GUI client 205 are processed a to a server 210 and saved in corresponding sequence databases 245. Thus, by way of example, each separate sequence created by the GUI client 205 has a separate sequence database 245. When a scheduler 225 signals a sequence execution process 220 to run a specific sequence, the sequence execution process 220 retrieves the sequence from the corresponding sequence database 245 to determine the steps to run. In one embodiment, the GUI client 205 exchanges information with the server 210, including for example, the data input by a user. The scheduler 225 has read access to the sequence database 215. When requested by the GUI client 205, the server 210 directs the scheduler 225 to put sequences on-line or take sequences off-line. When a sequence is on-line, it is ready to run under the direction of the scheduler 225. When the server 210 requests the scheduler 225 to place the sequence on-line, the scheduler 225 opens a sequence execution process 220 to control that particular sequence. Therefore, multiple sequence execution 220 processes may be open at any given time.

The scheduler 225 also communicates with one or more timers 230. The scheduler 225 may request an alarm to be set in the timer 230. The timer 230 communicates back to the scheduler 225 when the alarm is tripped. These alarms may include, for example, a calculated end of a sequence time or a calculated start time of a new sequence. The timer 230 can monitor multiple alarms simultaneously.

The scheduler 225 maintains three collections of pointers to on-line sequences: on-line, scheduled, and running. The on-line collection may be sorted by name and contains pointers to the associated sequence execution process 220. The scheduled collection is sorted by next runtime and contains those sequences that are on-line and scheduled. The running collection is sorted by next kill time and contains sequences that are on-line and running. Periodically, the scheduler 225 checks the scheduled and running collection for the next event. When the time occurs for a sequence to be started, the scheduler signals the appropriate sequence execution process 220 to run the sequence. The schedule 225 monitors the sequence status in the sequence database 215 to determine when the sequence has completed execution.

When a sequence execution process 220 receives a start signal from the scheduler 225, the sequence execution process 220 begins executing the sequence and sets the status of the sequence in the sequence database 215 to running. Upon completion of the sequence, the sequence execution process 220 sets the status of the sequence back to waiting in the sequence database 215. If the execution time of a sequence exceeds the limit and needs to be killed, the scheduler 225 transmits a kill signal to the sequence execution process 220. The sequence execution process 220 then stops and resets the sequence. The sequence execution process 220 then sets the status of the sequence back to waiting in the sequence database 215.

In one embodiment, during execution of a sequence, the sequence execution process 220 may write messages to the message server 235. The message server 235 then writes the messages to a message log database 240 for access by the server 210. The sequence execution process 220 continues running the sequence while the messages are processed. To allow multiple sequence execution processes 220 to run at any given time, the message server 235 handles all messages from the sequence execution processes 220 on a first-come, first-serve basis. Advantageously, when the GUI client 205 creates a sequence designated as a model sequence, the server 210 communicates with a model application server 250. The model application server 250 stores the model sequences in a model application database 255. The model application sequences are used to simulate real time sequences, and can be used to optimize the process. Details on optimization and modeling of material process systems are included in the co-filed applications entitled INTERACTIVE PROCESS MODELING SYSTEM and PROCESS MODEL GENERATION INDEPENDENT OF APPLICATION MODE filed on even date herewith and which are hereby incorporated by reference in their entirety.

Figure 3:
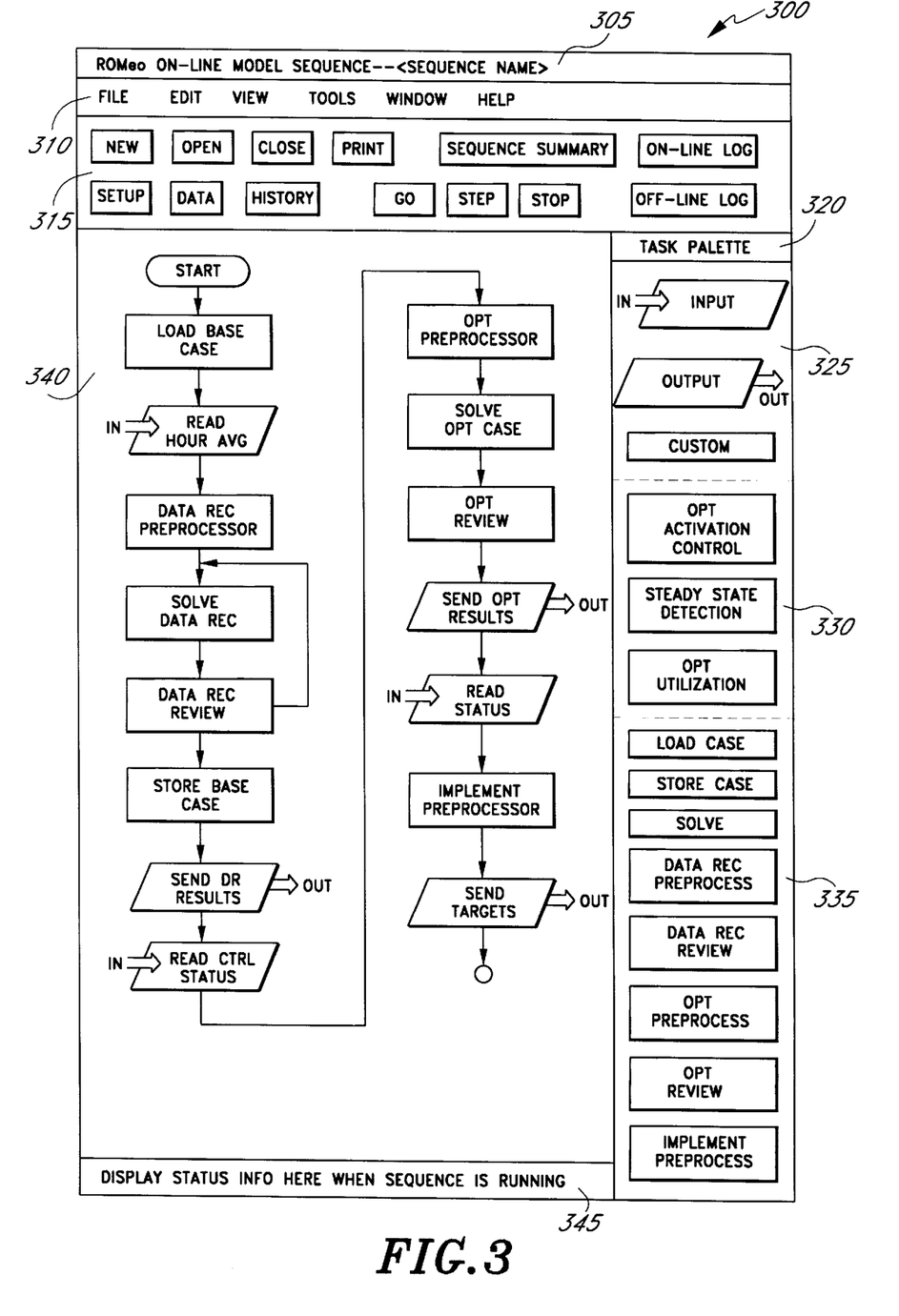
FIG. 3 is a sample screen view of a sequence development window as used in the real time scheduling software according to one embodiment of the present invention.

An example of the GUI interface 205 according to one embodiment of the present invention is shown in FIG. 3. For each sequence created, a sequence process flow diagram (PFD) window 300 is opened. In this embodiment of the PFD window, the name of the sequence is displayed in the identification bar 305. In one embodiment, each sequence has a unique identifying name. A series of pulldown menus 310 and a button bar 315 are provided for the user to interface with the PFD window 300. The use of pulldown menus 310 and button bars 315 are well known in the art and therefore do not require further explanation herein. The PFD window 300 also includes a sequence display window 340 which provides a graphical display of the current sequence to the user. When the sequence PFD window 300 is first opened, the sequence display window 340 is blank. The user creates a sequence by using a keyboard, a mouse, or other pointing device such as a trackball or joystick to drop and drag tasks from the task palette 320 into the sequence display window 340. The tasks are selected from one of the several task palettes 320. To add the task to the current sequence, the user drags the task into the proper location in the sequence display window 340. The task palette 320 is subdivided into several categories. For example, in a general task window 325, basic tasks such as an input task, an output task and a custom task are displayed. Details of specific types of tasks are discussed below. In a model task window 335, tasks appear that would be used for a model application sequence. These are tasks such as load case, store case, and solve, which would not be used to control a plant, but would be used to simulate the control of a plant. The generic task window 330 displays tasks used during generic sequences. In one embodiment, the sequence display window 340 provides a continual visual display to the user of the tasks included in the current sequence.

Figure 4A:
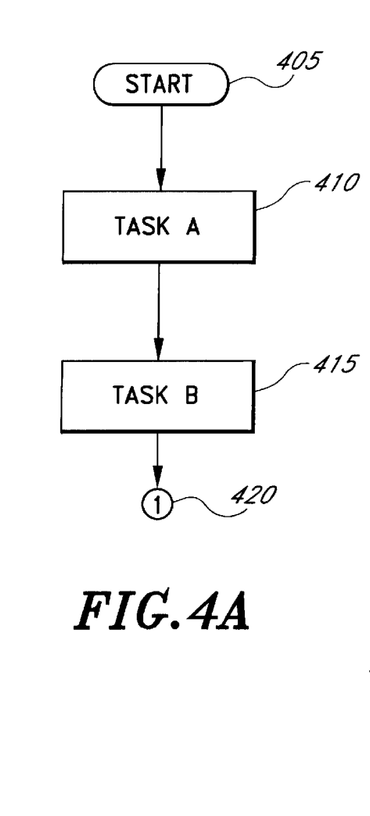
FIGS. 4A–4D illustrate the manner in which a task may be added to a sequence according to one embodiment of the present invention.
Figure 4B:
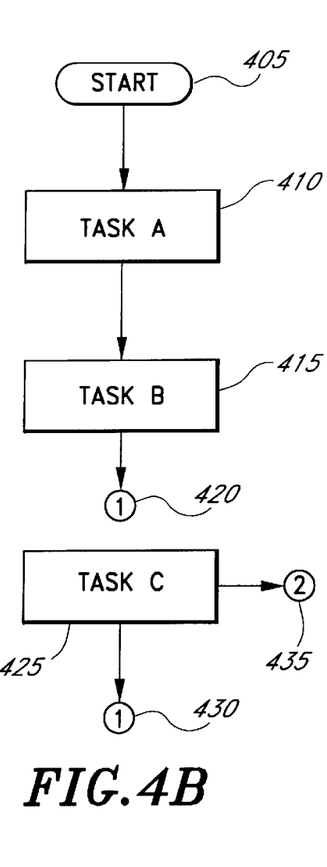
Figure 4C:
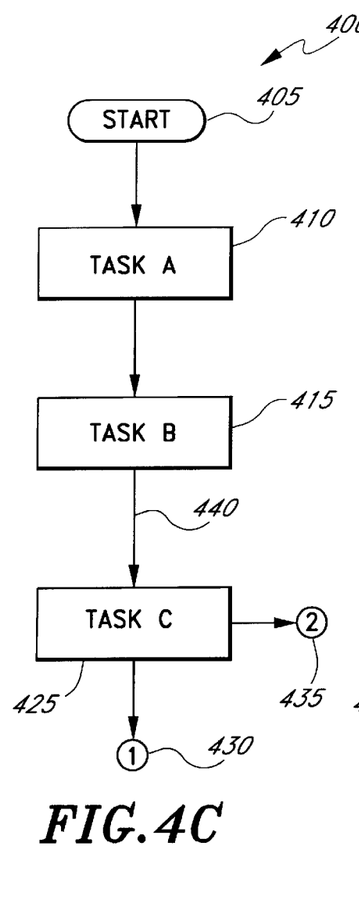
Figure 4D:
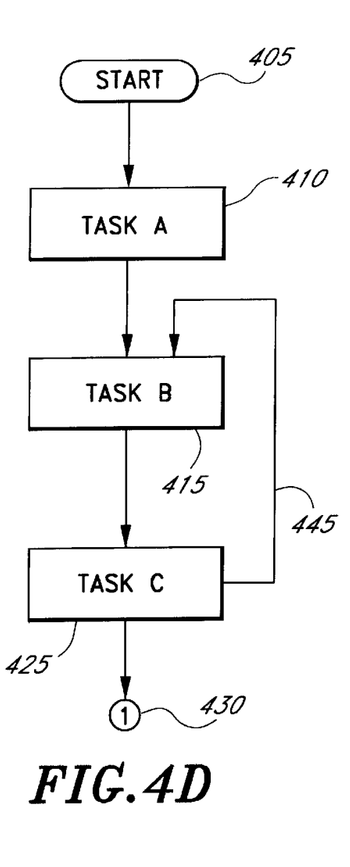

An example of a process of creating and modifying a sequence using the sequence PFD window 300 is shown in FIGS. 4A–4D. In FIG. 4A, an initial sequence is created which includes a start state 405 followed by a Task A 410 and a Task B 415. An exit branch 420 of Task B is a terminal exit branch which causes the sequence to stop running. In FIG. 4B, the user has selected and dragged a third Task C 425 having two terminal exit branches 430 and 435 into the sequence display window 340. Task C 425 is selected from one of the task palettes 320. In FIG. 4C, the initial sequence is connected to the new Task C 425 by a line 440. The line 440 is created by dragging the terminal exit branch 420 from Task B 415 onto Task C 425. By connecting Task C 425 to Task B 415, the terminal exit branch 420 of Task B 415 is deleted. At this point, the sequence has two terminal exit branches, 430 and 435, from Task C 425. In the present example, Task C 425 contains branching logic which, under certain conditions, would revert the user back to Task B 415. To establish this branch, the terminal point 435 from Task C 425 is connected back to the input of Task B 415 as shown in FIG. 4D. This creates a recycle loop 445 in the sequence. Now the sequence in FIG. 4D contains the third Task C 425 with one terminal exit branch 430. The details of each task can be displayed and modified by double-clicking on the respective task icon in the sequence window 340 as discussed in detail below.

Thus, the sequence created in FIGS. 4A–4D includes the recycle loop 445. By having more than one output branch in a task, a sequence is able to advantageously employ branching logic. Branching logic may be used, for example, to continue to refine modeling estimations in a task until all the data is reconciled. Without branching logic, the task could end without any guarantee the data is reconciled. Another example of the usefulness of branching logic is when interactions are used to optimize the sequence. Without branching logic, the task needed to estimate the number of iterations necessary before the sequence is optimized. By including branching logic, the task can be repeated until a specified condition, in this case the sequence being optimized, is obtained.

The sequence PFD window 300 also assists the user in creating sequences by providing feedback to the user on the status of the sequence. In one embodiment, each task is visually coded to indicate to the user the state of the task. In one example, the coding is a color code. For example, if a task is not fully specified or has no entry point, the color of the task border may be red. Thus, in the examples in FIGS. 4A–4D, Task C in FIG. 4B would have no entry point and therefore would be bordered in red. If a task is fully specified and ready to run, the task border would be black. When each task has a black border, the user knows the sequence is fully specified and ready to run. A task which has been determined to be inactive may be bordered in gray. Other types of coding may include text messages indicating the task state.

The visual coding is also useful during execution of the sequence to indicate to the user the status of the sequence execution. In one example, upon initialization of the sequence, all the task borders are set to white. When a task in a sequence is currently running, its border is set to green. After successful execution of a task, the border may be changed to blue. If a task was terminated abnormally, the border may be set to red indicating error for the user to investigate.

Figure 5:
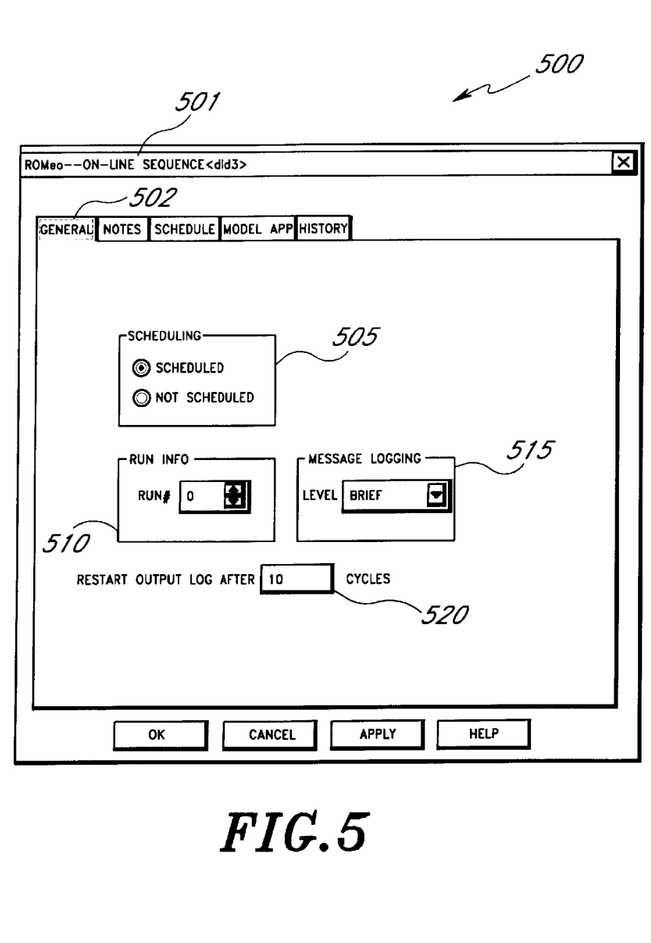
FIG. 5 is a sample screen view of a dialog box used to establish parameters for a sequence according to one embodiment of the present invention.

Once all the tasks in a sequence have been fully specified, the sequence can be initialized. Clicking on the setup button on the toolbar 315 of FIG. 3 causes a dialog box 500 similar to that as shown in FIG. 5 to be displayed on the screen. A title bar 501 of the dialog box 500 contains the name of the sequence. Below the title bar 501 are a series of tabs used to modify the sequence setup. The dialog box 500 shown when a general tab 502 is selected is shown in FIG. 5. Selecting the general tab 502 displays a scheduling box 505. In the scheduling box 505, the user has the option of selecting whether a sequence is to be scheduled or not scheduled. If a sequence is scheduled, then the scheduling information for the sequence is used to determine when the sequence is executed. The scheduling information will be described below in further detail. If the sequence is not scheduled, then the sequence may be demand-activated by a task within another sequence. For example, a sequence for data reconciliation may not be scheduled but may be activated by another sequence or task which detects the process to be at steady state. A run information box 510 displays the current run number of the sequence. The run number is incremented automatically each time the sequence is executed. This number is used for creating unique objects and output file names for each run of the sequence. For example, data files on any sequence run may be saved using a filename which includes the run number. This ensures each data file has a separate name.

All on-line sequences may write messages to an on-line message log. A message logging box 515 allows the user to select the level of messages for the sequence to write to the on-line message log. For example, the message level may be set to, among other things, brief, detailed, no message logging, or logging exceptions. The selected level can be overridden by individual tasks within the sequence, but serves as a default for all tasks.

If the sequence is to create an output log, an output log box 520 allows the user to specify the number of cycles to keep in an output log before the log is restarted. This allows the user to control the amount of memory taken by the output log.

In one embodiment, when a sequence is scheduled, the sequence scheduling information is input under a schedule tab 605 as shown in exemplary FIGS. 6A–6D. When a sequence is scheduled, the time at which it will be automatically executed is determined by the information supplied on the schedule tab 605. The user selects the frequency at which the sequence is to be executed in the run occurs box 650. The user has the options of more than daily, daily, weekly, or monthly. Other options may be provided as well. Regardless of which option is chosen, the user enters a begin time 610 and a limit time 630. The begin time 610 indicates the time of day that the sequence is to be run. A begin date 620 to be used in connection with the begin time 610 is also established. A limit time 630 is the maximum amount of time that the sequence can be run before some intervention will be taken by the scheduler. When the sequence exceeds the limit time, a desired action to be taken may be selected from a drop-down menu 635. Some over-limit actions include sending messages to the error log to allow the sequence to continue, to stop the sequence and reschedule, to stop the sequence or remove it from the schedule, or to ignore the over-limit.

Figure 6A:
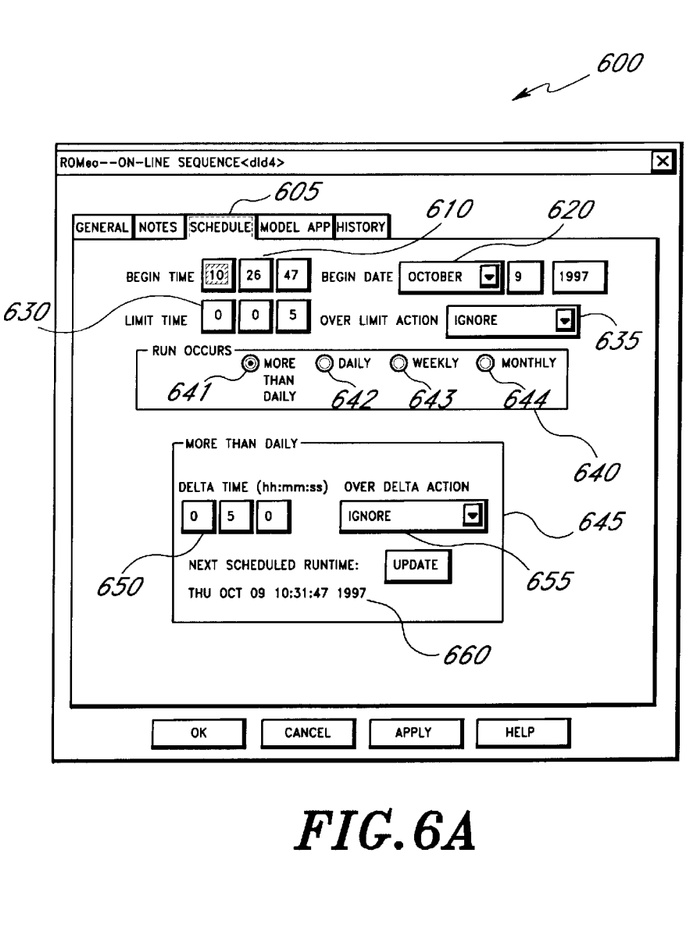
FIG. 6A is a sample screen view of a dialog box used to schedule a sequence when the sequence occurs more than daily.

The frequency of execution of a sequence may be selected in a run occurs box 640. In one embodiment, the run occurs box 640 includes a more than daily button 641, a daily button 642, a weekly button 643, and a monthly button 644. If the sequence is selected to run more than once per day by clicking the more than daily button 641, a more than daily box 645 as shown in FIG. 6A is displayed to allow input of a delta time 650. The delta time 650 is the amount of time between scheduled executions. The sequence adds the delta time 650 to the begin time 610 to determine a subsequent start time for the sequence. For example, if a begin time of 12:00 and a delta time of 5 minutes is selected, the sequence is set to execute every 5 minutes beginning at 12:00. This results in the sequence executing 12 times an hour at 5 minutes past the hour, 10 minutes past the hour, 15 minutes past the hour, and so on. The action the sequence should take if the system does not start within the delta time 650 may be specified in the over-delta action box 655. These actions are similar to the actions in the over-limit action box 635. Finally, the next scheduled run time 660 of the sequence is displayed in the more than daily box 645. This provides a constant indication of when the sequence is scheduled to run next.

Figure 6B:
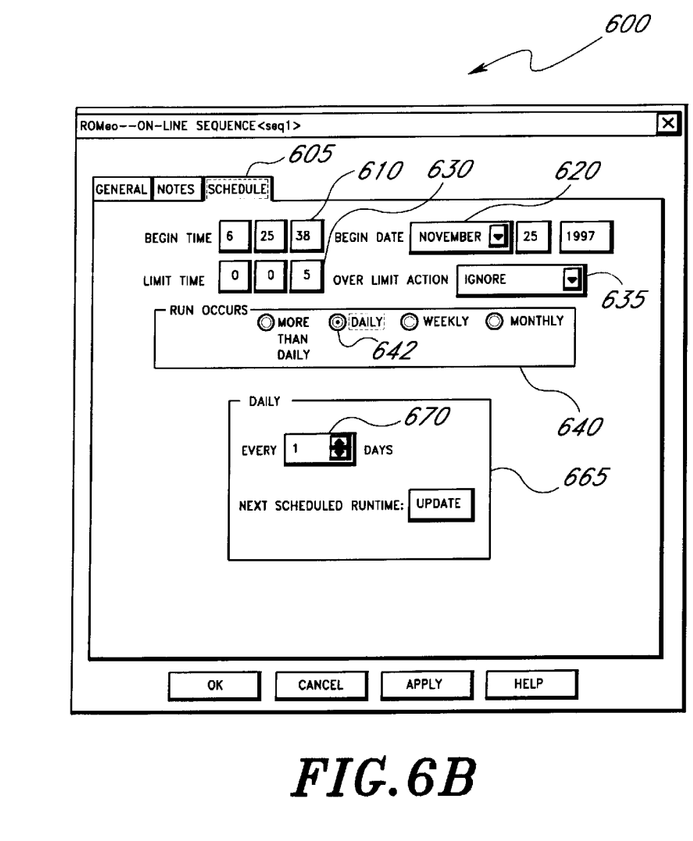
FIG. 6B is a sample screen view of a dialog box used to schedule a sequence when the sequence occurs daily.

If the daily option is selected in the run occurs box 640 by clicking on the daily button 643, the daily option box 665 appears as shown in FIG. 6B. The number of days between executions of the sequence may then be selected. For example, if one day is entered in a frequency box 670, the sequence would execute at the begin time 650 every day starting with the begin date 620. If the value entered in the frequency box 670 is greater than one, the sequence will be executed on the day designated as the begin date 620 and then every N days after that where N is the number of days entered.

Figure 6C:
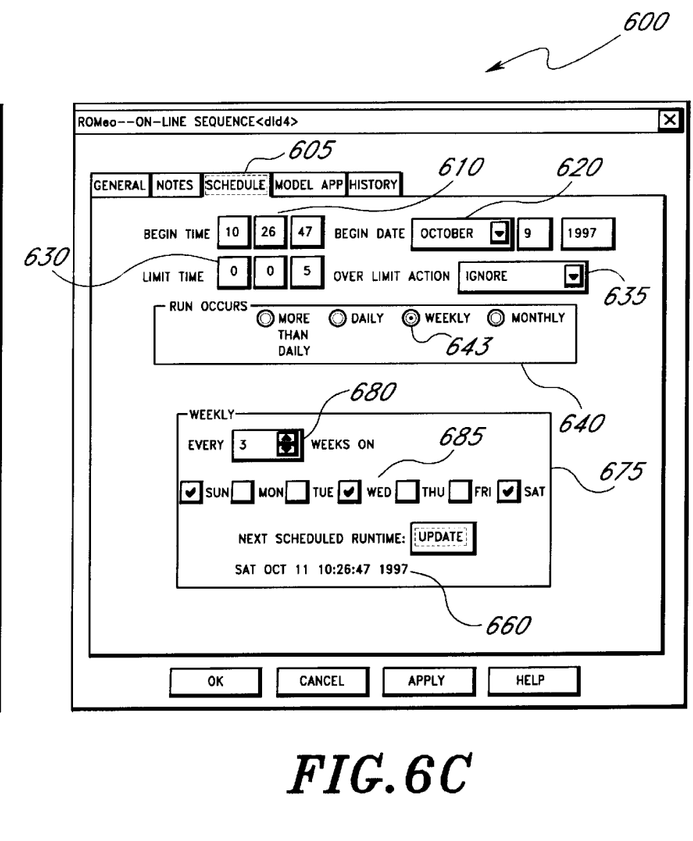
FIG. 6C is a sample screen view of a dialog box used to schedule a sequence when the sequence occurs weekly.

If the weekly option is selected in the run occurs box 640 by clicking on the weekly button 643, the weekly selection box 675 as shown in FIG. 6C is displayed. How often on a weekly basis the sequence runs may then be selected using a weekly frequency box 680. For example, if one week is entered in the weekly frequency box 680, the sequence runs on the same days each single week. The days of the week on which the sequence run is to occur is selected using checkboxes 685. To run the sequence on a less frequent scale, the number in the weekly frequency box may be increased. This results in the sequence running only every N weeks on the specified days. The weekly frequency box 675 also includes an indication of the next scheduled run time 660 based on the frequency selected.

Figure 6D:
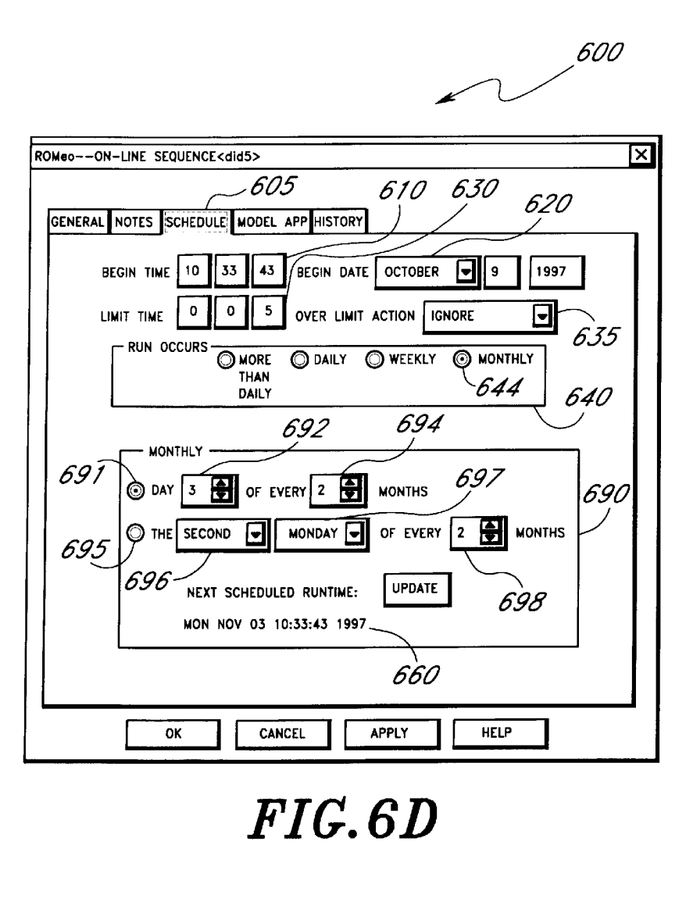
FIG. 6D is a sample screen view of a dialog box used to schedule a sequence when the sequence occurs monthly.

If the monthly option is chosen in the run occurs box 640 by clicking the monthly button 644, the monthly frequency box 690 as shown in FIG. 6D is displayed. In this situation, there are two choices in how to specify which day of the month to run the sequence. When a day option 691 is selected, a particular day 692 of the month for the sequence to run is entered. An option also exists to select a monthly frequency 694 for the sequence to run. The second option is very flexible, allowing the first, second, third, fourth, or last particular day, i.e., Sunday, Monday, Tuesday, Wednesday, Thursday, Friday, or Saturday, of some number of months to be selected. The first, second, third, fourth, or last day is selected from a day frequency pick list 696. The particular day to run the sequence is selected from a day pick list 697. The monthly frequency window 698 allows a sequence to run every N number of months. As with the other sequences, the next scheduled run time 660 is displayed to the user.

Figure 7:
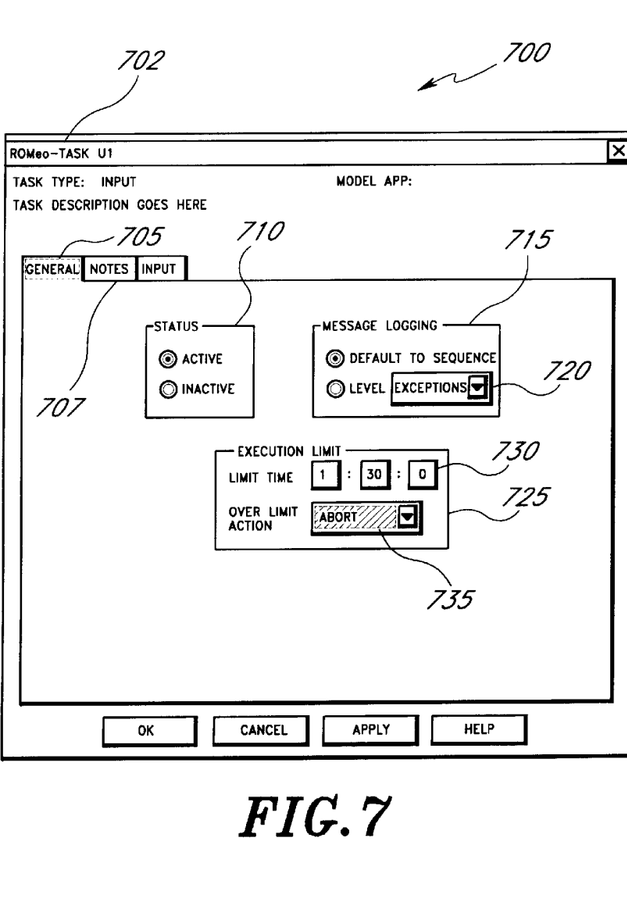
FIG. 7 is a sample screen view of a dialog box used to establish parameters for a task according to one embodiment of the present invention.

In addition to scheduling the sequences, each task in a sequence may be defined by double clicking on the selected task in the sequence window 340, thereby displaying a task dialog box 700 for the task, one embodiment of which is shown in FIG. 7. As described above, each sequence is composed of a list of tasks. Each task is associated with a separate task dialog box 700. In each task dialog box 700, the title bar 702 contains the name of the task. Below the title bar, general information about the task appears including the task type and task description. Under a general tab 705, the task can be designated as activate or inactivate by selecting an appropriate activation level, either active or inactive, from a status box 710. When inactive, the task is bypassed in the sequence and the next task following the "continue exit branch" of the inactive task is designated to be executed next.

The task dialog box 700 also contains a message logging box 715. The message logging box 715 establishes the level of message logging to be performed by the task. The task may be set to default to the same level of message logging as is set for the entire sequence by clicking on the default to sequence option, or the task may override the sequence setting with a task-specific level from the pick list 720 by clicking on a level option. Types of message logging levels are described above with respect to the message logging box 515.

The task dialog box 700 also contains an execution limit box 725 to limit the amount of time allowed to execute the task. The maximum amount of time for the task to execute can be entered in the limit time box 730. If a limit time 730 is specified, an over-limit action should also be specified from the pick list 735. The over limit actions include, by way of example, logging an error message and continuing, aborting the task and continuing the next task, or stopping the entire sequence. A notes tab 707 in the task dialog box 700 may be selected to allow the user to enter documentation associated with the particular task. These may include a short description of the task or detailed notes about the task.

Figure 8:
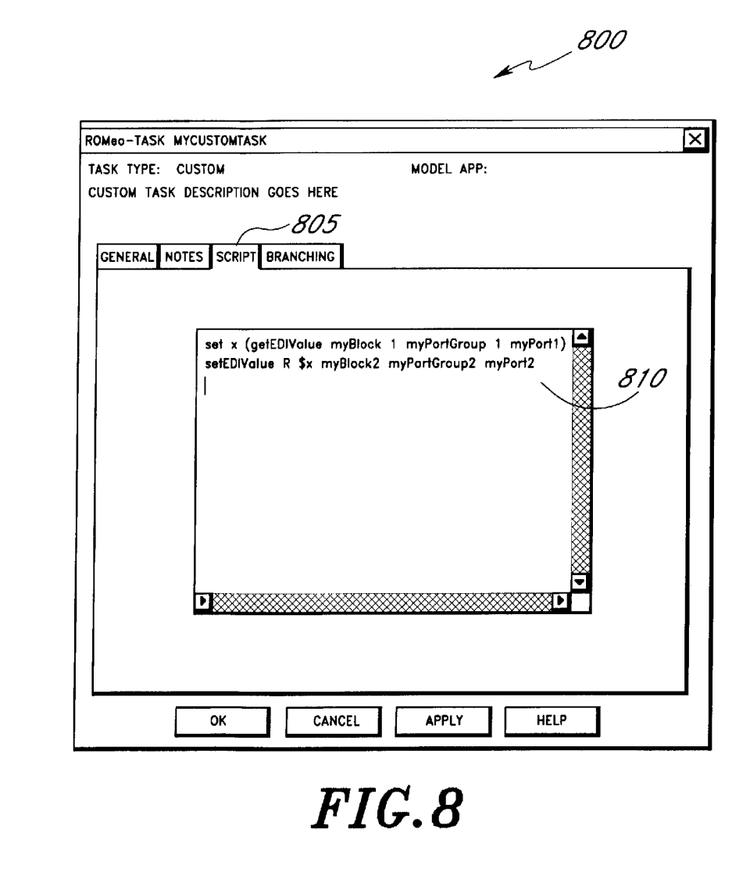
FIG. 8 is a sample screen view of a dialog box used to program a script to create a custom task according to one embodiment of the present invention.

To provide for maximum flexibility, custom tasks may be created and included in the sequence. If a custom task is selected from the list of task icons in the task palette 320, the custom task dialog box 800 appears as shown in FIG. 8. By selecting a script tab 805, a script defining the task may be input. In one embodiment of the invention, the Tool Command Language (TCL) is used. Of course, other scripting languages may be used without departing from the spirit of the invention. The task script defines the instructions to be run when the task is executed. Within the task script, any of the published methods defined for any of the objects in the system may be called. A custom task also has access to any custom data defined for the task. At the completion of the task, the custom task may select an appropriate exit branch. In one example, a custom task could be programmed to provide a visual indication to the user when the plant data is optimized.

Figure 9:
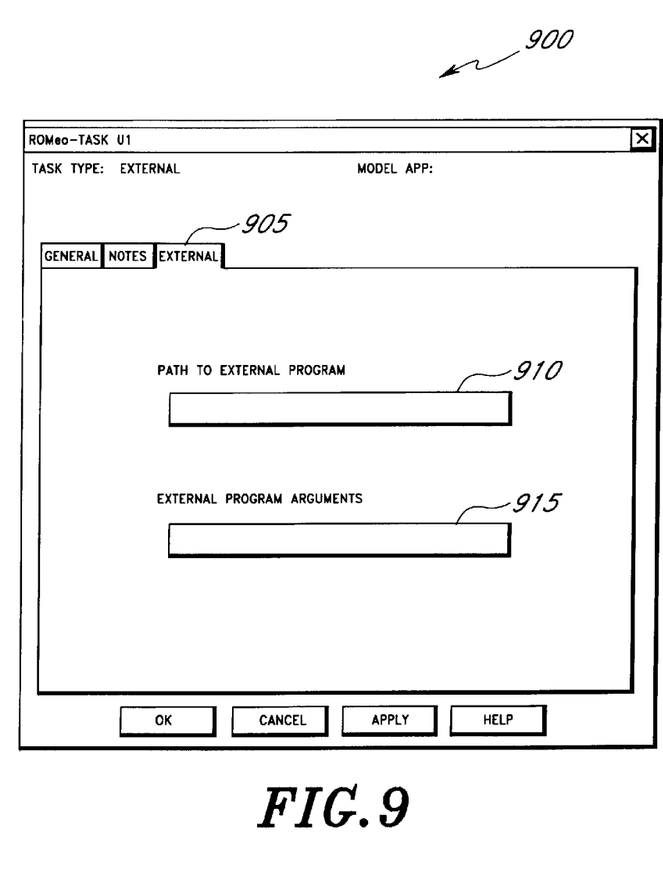
FIG. 9 is a sample screen view of a dialog box used to establish parameters for a task to run an external program according to one embodiment of the present invention.

To further enhance the flexibility of the sequences, the ability to run an external program as a task is provided. If the external program task is selected from the task palette 320, an external program dialog box 900 as shown in FIG. 9 is displayed. Under an external tab 905, the path to the external program is provided in a path box 910. Any particular arguments needed for the external program can be provided in an arguments box 915. This approach advantageously allows a user to develop customized programs to handle unique plant requirements.

Of course, there are many different types of tasks that can be added to a sequence. As explained below, these tasks include an input task, an output task, a load case task, an e-mail task, a store case task, a solve task, a data reconciliation pre-processing task, a data reconciliation review task, an optimization pre-processing task, an optimization review task, an implementation pre-processing task, a model sequence activation control task, and a steady state detection task.

An input task allows a user to import data from an external data source or from a file and to download the data to define an input and an output block. The imported data may contain plant history data to assist in optimizing the plant model. An output task is similar to the input task. However, in the output task, the user chooses export and upload options. The e-mail task sends an e-mail message to the designated address. The user enters the e-mail address in the text of the message, to send a message notifying an operator or other program of a critical failure or other designated message. The load case task is used to load a case or set of data into the flow sheet of the associated model application. The store case task allows the user to store the data currently loaded in the flow sheet. The solve task allows the user to solve a case, e.g., a simulation or optimization problem, that has been defined for the flow sheet.

The calculation mode can be selected or a default calculation mode may be used. Advantageously, a single flowsheet configuration is enabled to be used in multiple calculation modes. In one preferred embodiment, three calculation modes, simulation, data reconciliation, and optimization, are provided. The calculation modes refer to alternative flowsheet solution-types that are designed to accomplish different solution objectives. For example, a single flowsheet model may generate an openform equation representation for use in simulation, an open-form equation representation for use in data reconciliation, and an open-form equation representation for use in optimization.

The data reconciliation pre-processing task performs the steps necessary to prepare a data reconciliation case for the flow sheet to be solved. The data reconciliation review task reviews the solution of a data reconciliation case and determines what task to perform next based upon the results. The optimization pre-processing task performs the pre-processing steps necessary to set up an optimization case for the flow sheet. The optimization review task reviews the results of an optimization solution. The implementation pre-processing task performs the pre-processing steps necessary before sending targets to the controllers. The model sequence activation control task controls the activation of on-line model sequences that are not scheduled. The activation is based on various criteria that is set up for each on-line model sequence.

Figure 10:
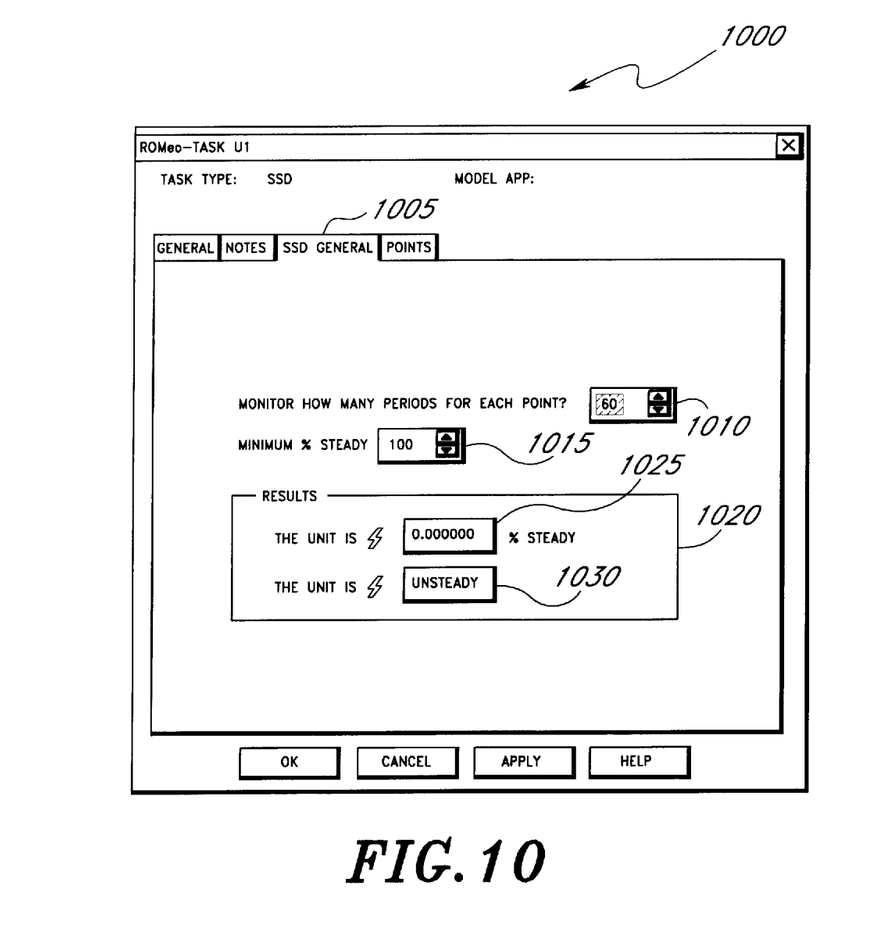
FIG. 10 is a sample screen view of a dialog box used to establish parameters for determining steady state detection according to one embodiment the present invention.

A steady state detection task determines if the unit is steady or unsteady by monitoring the values of a set of process measurement points. Selecting a steady state detection task causes a steady state detection task dialog box 1000 to be displayed as shown in FIG. 10. The circumstances which define steady state can therefore be varied in each sequence. In the steady state detection task dialog box 1000, the number of periods to be monitored for steady state is set in a period monitoring selection box 1010. For example, a history of the last N (where N is the number of periods entered by the user) measured values of each point is obtained and a statistical test is performed to determine whether the value of the point has significantly changed. If the point has not significantly changed, the value is determined to be steady. The minimum percentage of individual points needed to be steady for the overall unit to be considered in steady state can be specified in a threshold box 1015. In a results box 1020, the average of all points "percent steady" values is displayed in a percent steady box 1025. The percent steady box 1025 value is compared with the minimum percent required for steadiness as entered in the threshold box 1015, and the final result is given to the user as steady or unsteady in a steadiness indication box 1030.

Figure 11:
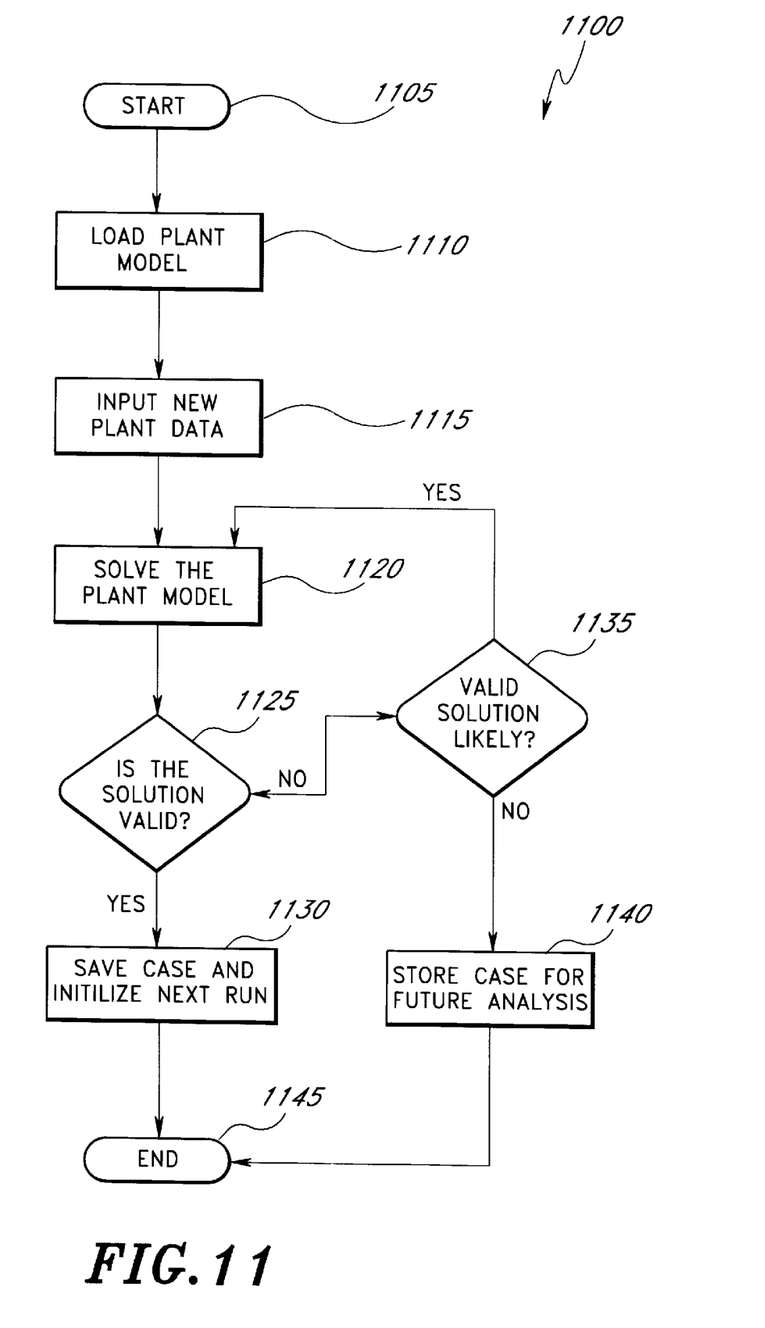
FIG. 11 is a sample sequence that may be created according to one embodiment of the present invention.

One example of a sequence 1100 created by one embodiment of the present invention is illustrated in FIG. 11. The sequence 1100 begins as indicated in a start state 1105. Proceeding to state 1110, the sequence load a previously configured solution of a plant model. The specifics of the layout and operation of the plant are included in the plant model. The plant model may be the result of a series of previous sequences.

Proceeding to state 1115, the sequence 1100 inputs new plant data. The data can be input by a user from the keyboard or may be downloaded from historical data. The sequence then proceeds to state 1120, where the software attempts to solve the plant model.

Proceeding to state 1125, the solution from state 1120 is checked to determine if the solution is valid. If the solution is valid, the sequence 1100 proceeds along the YES branch to state 1130. In state 1130, the sequence saves the solution and initializes the software for the next run. The sequence 1100 then proceeds to end state 1145.

Returning to state 1125, if the solution is not valid, the sequence 1100 proceeds along the NO branch to state 1135 to determine if more iterations are likely to produce a valid solution. If there is an indication additional iterations might produce a valid solution, the sequences proceeds along the YES branch back to state 1120. The sequence may remain in this loop until either the solution is valid or a determination is made more iterations are not likely to produce a valid solution.

Returning to state 1135, if it is determined a valid solution is not likely, the sequence 1100 proceeds along the NO branch to state 1140. In state 1140, the case is stored for future analysis. The sequence then proceeds to end state 1145.

Numerous variations and modifications of the invention will become readily apparent to those skilled in the art. Accordingly, the invention may be embodied in other specific forms without departing from its spirit or essential characteristics. The detailed embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of optimizing and controlling a material processing system, the method comprising the acts of:
   creating a series of sequences with a graphical user interface by selecting and placing a plurality of tasks in a specified relationship, wherein the plurality of tasks define functions to be performed for optimizing and controlling the material processing system;
   defining a start time, a duration, and a frequency of operation of at least one of said sequences;
   automatically activating said at least one sequence at the defined start time;
   performing a specified function as defined by at least one of the plurality of tasks following the duration of said at least one sequence at least partly in response to a measurement point related to the operation of the material processing system;
   detecting a steady state condition; and
   calculating a next run-time of at least one of said sequences.

2. The method of claim 1, wherein at least one of the series of sequences represents a mathematical model of the material processing system.

3. The method of claim 2, wherein the mathematical model is used to optimize the material processing system.

4. The method of claim 3, further comprising the step of controlling the material processing system using the optimized mathematical model.

5. The method of claim 1, wherein the series of sequences transmits control signals to a process control network.

6. The method of claim 5, wherein the process control network controls the material processing system.

7. The method of claim 1, wherein at least one of said plurality of tasks comprises an input branch and at least one output branch.

8. The method of claim 1, wherein at least one of said plurality of tasks has a plurality of output branches.

9. The method of claim 8, further comprising the step of selecting one of said plurality of output branches.

10. The method of claim 9, wherein the one of said plurality of output branches is selected at least partly based upon results of a conditional operation.

11. A real time graphical task scheduler including branching logic stored on a computer readable media for simulating and controlling material processing systems comprising:
   a graphical user interface having a plurality of task icons representing a plurality of tasks;
   means for placing a first task in a sequence by selection of a first task icon in the graphical user interface;
   means for associating a second task having a plurality of output branches to the first task by selection and connection of a second task icon to the first task icon in the graphical user interface; and
   means for selecting one of the plurality of output branches of the second task, where the means includes branching logic adapted to select an output branch at least in part by detection of a steady state condition that is unlikely to produce a valid condition.

12. The real time graphical task scheduler of claim 11, wherein the placing means uses a pointing device.

13. The real time graphical task scheduler of claim 11, wherein the sequence may be scheduled to begin at a predefined time.

14. The real time graphical task scheduler of claim 11, wherein the selecting means is based upon a conditional statement defined in one of the plurality of tasks.

* * * * *